United States Patent [19]

Johnsson

[11] Patent Number: 4,732,220

[45] Date of Patent: Mar. 22, 1988

[54] APPARATUS FOR BRIEFLY AND IMPULSIVELY RELEASING MECHANICAL ENERGY

[75] Inventor: Bo E. G. Johnsson, Järna, Sweden

[73] Assignee: Marcus Komponenter AB, Jarna, Sweden

[21] Appl. No.: 908,967

[22] PCT Filed: May 16, 1984

[86] PCT No.: PCT/SE84/00187

§ 371 Date: Jan. 8, 1985

§ 102(e) Date: Jan. 8, 1985

[87] PCT Pub. No.: WO84/04571

PCT Pub. Date: Nov. 22, 1984

Related U.S. Application Data

[63] Continuation of Ser. No. 688,448, Jan. 8, 1985, abandoned.

[30] Foreign Application Priority Data

May 19, 1983 [SE] Sweden .............................. 83028530

[51] Int. Cl.$^4$ ......................... F16H 33/00; B25D 1/00
[52] U.S. Cl. ..................................... 173/119; 173/124
[58] Field of Search ................. 173/89, 119, 122, 123, 173/124; 74/55, 569

[56] References Cited

U.S. PATENT DOCUMENTS

| | | | |
|---|---|---|---|
| 458,184 | 8/1891 | Morgan | 173/119 |
| 864,838 | 9/1907 | Fowden | 173/123 |
| 1,162,636 | 11/1915 | Miller | 173/123 |
| 1,267,174 | 5/1918 | Bert | 173/123 |
| 1,381,745 | 6/1921 | Robb | 74/569 |
| 1,464,824 | 8/1923 | Kollock et al. | 173/123 |
| 2,201,023 | 5/1940 | Brown | 173/123 |
| 2,298,792 | 10/1942 | Hicks | 173/123 |
| 2,772,858 | 12/1956 | Galvez | 173/122 |
| 2,825,207 | 3/1958 | Cullum | 173/123 |
| 3,587,754 | 6/1971 | Laatsch | 173/124 |
| 3,747,691 | 7/1973 | Lundman et al. | 173/124 |
| 4,421,180 | 12/1983 | Fleishman et al. | 173/124 |

FOREIGN PATENT DOCUMENTS

| | | | |
|---|---|---|---|
| 369762 | 2/1923 | Fed. Rep. of Germany | 173/119 |
| 372042 | 5/1932 | United Kingdom | 173/124 |
| 815273 | 3/1981 | U.S.S.R. | 173/119 |

*Primary Examiner*—Lawrence Staab
*Attorney, Agent, or Firm*—Sughrue, Mion, Zinn, Macpeak and Seas

[57] ABSTRACT

A piston (3) for impulsively delivering mechanical energy is connected with a crank shaft (5) having a pin (5a) in co-action with a first coupling member (2a, 2b) on a rotatable member (2). The pin (5a) forms a second coupling member, which accompanies the movement of the rotatable member (2) during one half revolution thereof, whereupon an energy-absorbing means, for example, a spring (4) arranged around the piston (3) is compressed. When the rotatable member (2) has reached a limit position, the coupling engagement between the coupling members is instantaneously broken, whereupon the energy stored in the spring or the like is transferred to the piston, which executes an impulsive percussion movement. The cycle is repeated when the coupling member (2a, 2b) of the rotatable member is again brought into engagement with the pin (5a).

4 Claims, 7 Drawing Figures

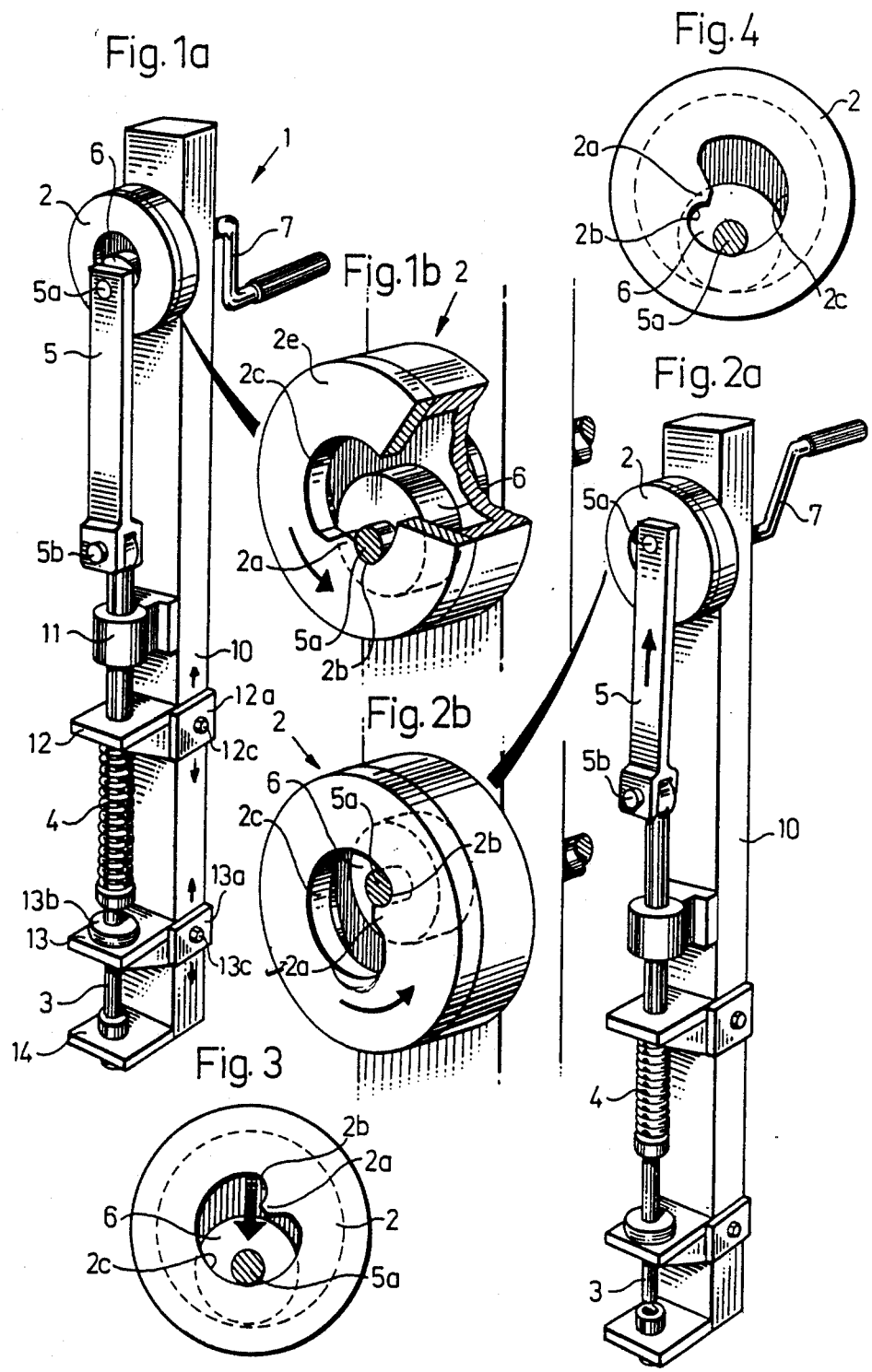

APPARATUS FOR BRIEFLY AND IMPULSIVELY RELEASING MECHANICAL ENERGY

This is a continuation of application Ser. No. 688,448, filed Jan. 8, 1985 abandoned.

TECHNICAL FIELD

The present invention relates to an apparatus for briefly storing and impulsively releasing mechanical energy. Such apparatus can find application and use in many fields within the technique, for example in connection with various percussion tools and apparatus, punches and presses, rock-drilling machines, compressors and high-pressure pumps, and the like.

More specifically, the invention can be said to relate to an apparatus for stepping-up the mechanical power output of machines. In this respect, energy is stored by means of an arrangement having a comparatively low power output over a relatively long period of time, and is thereafter released impulsively over a very short period of time at a high power output, whereby it can be said that the power input has been stepped-up.

More particularly, according to one aspect of the invention there is provided an apparatus for briefly storing and impulsively releasing mechanical energy with the use of a stepwise or continuously rotating member arranged to coact with a power-delivering device, e.g. a piston, which when moving in one direction causes energy to be stored in an energy-absorbing means, e.g. a spring, gas or liquid, which energy, subsequent to said member passing a limit position, is delivered to said device, so as to produce an accelerated movement in the opposite direction.

BACKGROUND ART

Various apparatuses of this kind are known to the art. Reference can be made in this respect, by way of example, to various types of known cam and link-drive mechanisms, such as those of the kind described in Artobolevsky: MMED, Volume IV, No.: 3011, 3014, 3015 and 3016. These principle cam and link mechanisms can be used to produce normally complicated movement sequences, which also include the release of percussion forces at given times in the movement sequence.

U.S. Pat. No. 740,816 (Daily) describes an apparatus comprising a circular rotatable disk formed with a cutaway portion designed as a semiheartshaped cam. Along said cam moves a small roller which is coupled to a spring adapted to store energy. Compression of the spring commences at the point at the biggest distance from the disk's center and is released—however not instantaneously—at a point nearest the center.

Other types of apparatuses having outer cams are described in U.S. Pat. Nos. 870,653 (Warsop) and 1,137,272 (Moyle).

None of these known mechanisms, however, can be used successfully in a machine of the aforesaid kind, since among other things the wear on mutually coacting components subjected to load would quickly render the mechanism unusable. Neither are these mechanisms capable of effectively stepping-up the power output of a machine, and hence are not competitive in relation to other types of mechanisms available on the market.

Also known to the art is a high-speed cutting or shearing machine which uses a compressible spring in co-action with a release coupling which comprises a number of balls housed in a sleeve and arranged to lock a hammer in a retracted position. The hammer is released by lifting the sleeve, so that the balls are able to move out of locking engagement.

When the movements of such high-speed cutting or shearing machines are to be coordinated with the feed of the workpieces to be worked, production is restricted thereby to a maximum of 350 strokes per minute. Present day demands, however, require a marked increase in the working rate of such machines, and in the case of an eccentric press for example require a working speed which is at least twice that of the aforementioned, e.g. a working speed of 750–1000 strokes per minute, or still higher.

OBJECT OF THE INVENTION

One object of the invention is to provide an arrangement of the aforementioned kind which, despite the simplicity of design and the robust construction of said arrangement, provides a much faster working rate than known mechanisms.

Another object of the invention is to guide the power-delivering device effectively with a minimum of frictional losses when utilizing an arrangement of the aforesaid kind.

BRIEF DISCLOSURE OF THE INVENTION

These and other objects are fulfilled according to the invention by bringing a first coupling member, e.g. a recess defined by a projection, on the rotatable member into engagement with a second coupling member, e.g. a pin, connected with the power-delivering device and dogging the second coupling member through part of a revolution during rotation of said rotatable member, and causing the engagement of said coupling members to be broken under the action of stored energy as the aforesaid limit position is passed, so as to impart to the power-delivering device an impulsive movement in the opposite direction.

Because of the simplicity of the design of the coupling means, e.g. a coupling which simply comprises a recess defined by a projection and co-acting with a pin which is in connection with the power-delivering device, there is obtained an effective connection between the two coupling parts, without any marked time-lag or frictional losses. The remaining apparatus components can be of simple and robust constructional design intended to promote the efficiency of the method according to the invention, thereby to provide a higher production rate than that achieved with methods known hitherto.

In practice, during the aforementioned movement of the power-delivering device, the second coupling member is preferably arranged to move freely relative to a closed curve located radially inwardly of the periphery of the rotatable member, and to be captured by said closed curve, a part of said curve forming the first coupling member.

Because the rotatable member is provided with a closed curve inwardly of its periphery, the second coupling member is guided accurately and reliably in a path having constant radius during that part of its movement in which it is in contact with said curve. When the power-delivering device executes its impulsive movement under the influence of the energy stored in the energy-absorbing means, the second coupling member will move freely relative to the curve, to be immediately brought back possibly into contact with said curve, although with no risk of skewing or damage of any form to the curve or coupling means.

When practising the invention, the coupling members will remain in mutual engagement through approximately one-half revolution of the rotatable member. The second coupling member thereby moves and acts like an excentric shaft.

During the remaining half revolution of the rotatable member, the second coupling member moves in the aforesaid manner, i.e. freely and impulsively to a diametrically opposite location possibly but not necessarily on the curve, at which location said second coupling member remains more or less stationary until it is again brought into engagement with the first coupling member, for a further working cycle.

It will be understood, however, that said one half of the curve can be given differing forms, to cause the power-delivering device to move in the manner desired. Consequently, the appropriate part of the internal curved camming surface of the rotatable member can be shaped according to requirements.

It is also preferred in practice that movement of the second coupling member in the coupled position is transmitted to the power-delivering device through a crank arrangement. In this case, the second coupling member, which as beforementioned may have the form of a simple pin or peg, will function as a "floating shaft".

BRIEF DESCRIPTION OF THE DRAWINGS

FIG. 1a is a perspective view of a principally simple hand-operated apparatus according to the invention, intended to illustrate the principle of the invention.

FIG. 1b is a cut-away view in larger scale of the rotatable member of the apparatus, showing the associated first coupling member in a position in which it has just been brought into engagement with the second coupling member.

FIG. 2a is a perspective view of the arrangement illustrated in FIG. 1a, illustrating the position where the engagement between the coupling members is about to be broken.

FIG. 2b is a perspective view in larger scale of the rotatable member and the coupling members in said position.

FIG. 3 is a side view of the rotatable member, and shows the first and second coupling means in the position where the second coupling means has left the first coupling means and executed a downwards impulsive movement.

FIG. 4 is a side view corresponding to the view of FIG. 3, showing the position in which the first coupling member is about to engage the second coupling member.

FIG. 4 is a partially cut-away front view of essential components of a modified apparatus incorporating double rotatable members and coupling members in symmetrical arrangement, for use in a shearing or punching machine for example.

DETAILED DESCRIPTION OF PREFERRED EMBODIMENTS

Figure 5:
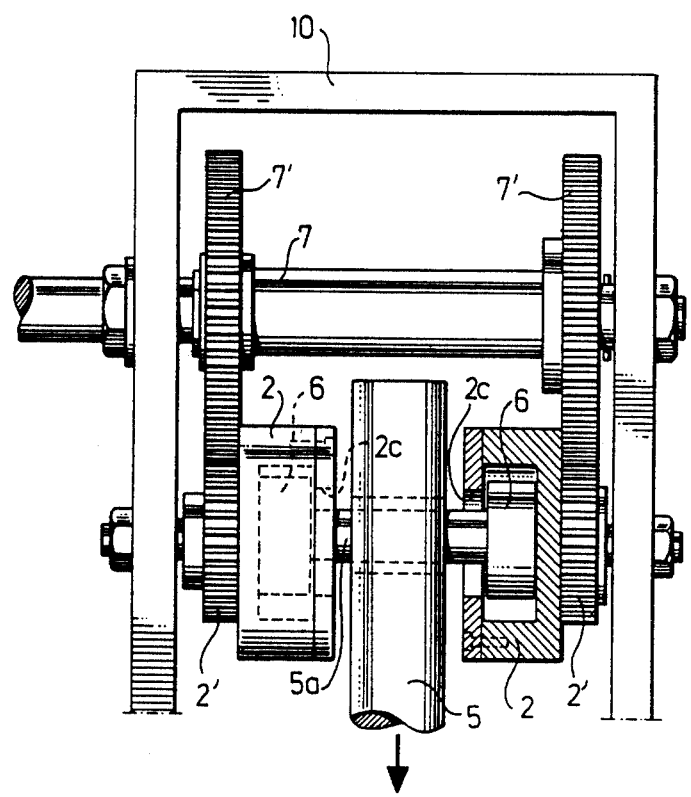

With reference to FIGS. 1a-4, an apparatus 1 according to the invention comprises, in its simplest form, a frame 10 which has mounted thereon a straight-guide 11 and plates 12, 13 and 14 for guiding a power-delivering device of a hole punch, for example the piston 3 of the illustrated embodiment. The piston co-acts with a spring 4 arranged thereon, said spring being compressed during upward movement of the piston, to store mechanical energy thereby. The upper end of the piston is connected to a crank shaft 5 by means of a pivot pin 5b while the upper end of the crank shaft carries a coupling means in the form of a pin or peg 5a arranged in a cylindrical roller 6. The roller 6 forms a guide in a rotatable member 2 journalled in the frame 10, said rotatable member being arranged for stepwise or continuous rotation by means of a drive means, such as the illustrated crank handle 7, for example.

As will be seen from FIG. 1b, the rotatable member 2 has an inner cavity which accommodates the roller 6, and that radially inwardly of the periphery of the rotatable member there is arranged a curve comprising three sections 2a, 2b and 2c.

The inwardly projecting curve section 2a and the adjacent recess-forming curve section 2b, partially defined by said projecting curve section 2a, forms a first coupling member associated with the rotatable member 2, which first coupling member—as illustrated in FIGS. 2b, 3 and 4—can be brought into engagement with the pin 5a, which thus serves as a second coupling member.

The first coupling member 2a, 2b of the rotatable member 2 is brought from the position illustrated in FIG. 1b into engagement with the pin, i.e. the second coupling member 5a, to cause said second coupling member to accompany the first coupling member 2a, 2b in its rotation to the position illustrated in FIG. 2b, in which position the spring 4 has been compressed to its maximum while storing mechanical energy therein.

The spring 4 therewith exerts a downwardly acting tension force on the second coupling member 5a, and when the first coupling member 2a, 2b has reached the position illustrated in FIG. 3, the first coupling member is no longer able to hold the second coupling member, whereupon the second coupling member is moved impulsively downwards with an accelerated movement, whereupon the energy stored in the spring 4 can be utilized, via the piston 3, to carry out mechanical work or to produce a power output.

The second coupling member 5a is captured on the opposite part of the curve 2a, 2b, 2c, and immediately after reaching the position illustrated in FIG. 4, the first coupling member 2a, 2b will soon again engage the second coupling member 5a, i.e. the coupling position illustrated in FIG. 1b is re-newed so as to carry out a further working cycle.

The coupling member 5a can be said to constitute a "floating shaft", the position of which during one half revolution of the rotatable member 2 is determined by the first coupling member 2a, 2b. It then moves like an eccentric shaft in a path having constant radius. However, it then leaves the first coupling member and moves freely to the position illustrated in FIG. 3 in which it may but preferably does not touch curve 2c. In practice, the rotatable member may comprise two parts, namely a coupling housing 2d and a cover 2e which is connected to the coupling housing 2d and which incorporates the curve 2a, 2b and 2c.

Subsequent to the piston 3 having executed a working stroke, it is possible that the energy-absorbing means, i.e. the spring 4 in the illustrated embodiment, will still contain energy. Preferably, this residual energy is taken-up by a damping means, so as not to be released between the second coupling member, i.e. the pin 5a and the surface 2c of the curve, i.e. in a no-load condition the pin should be in contact with the surface of curve section 2c.

Consequently, the illustrated embodiment is provided to this end with a damping means in the form of a resilient ring 13b, which encircles the piston 3 and which is made, for example, of urethane, said ring resting on the lower guide plate 13. In turn, the guide plate is adjustably arranged on the frame 10 and is provided for the said purpose with lateral guides 13a and an attachment means 13c which enable adjustment of the plate 13 and therewith also adjustment of the damping effect of the damping means.

The upper plate 12, which forms an abutment for the energy-absorbing means, is provided with corresponding lateral guides 12a and can also be adjusted relative the frame 10, by means of a fixing means 12c. First, by adjusting the vertical position of the plate 12 it is possible to affect the amount of energy stored in the energy-absorbing means, i.e. the spring 4.

In the FIG. 5 embodiment, like components are identified by like references. This figure illustrates the upper part of the apparatus, and illustrates a double arrangement of symmetric design.

The arrangement is intended for continuously rotating the rotatable members 2, said rotating being effected through a drive shaft 7 via two gears 7' which engage two gears 2' which are concentrically connected with the rotatable members 2. The rotatable members are oppositely arranged and are, in principle, of the same design as that illustrated in FIGS. 1-4.

In the FIG. 5 embodiment the shaft 5 also comprises a crank shaft, which carries a journal pin 5a which extends upwardly in both directions and serves as said second coupling member. Arranged on either end of the journal pin 5a is a respective guide roller 6. The arrangement is incorporated in a frame 10.

As will be understood from the aforegoing, the energy-absorbing means may have many different forms. For example, in addition to a compressible spring 4 of the kind illustrated in FIGS. 1-4, a gas or liquid may be used, said gas or liquid being suitably located in a cylinder and acted upon by a plunger co-acting with the power-delivering device 3 and the shaft 5.

It has also been mentioned in the aforegoing that the curve section 2c in the rotatable member 2 may also have a varying form in order to impart to the power-delivering device 3 varying movements after its impulsive movement. In certain cases it may be expedient, for example, to return the device 3 rapidly subsequent to carrying out a working stroke. This can readily be achieved by corresponding design of the curve section 2c.

Industrial Application

As beforementioned, an apparatus according to the invention can be used for many different purposes, such as percussion or power-generating means for punching, shearing, pressing operations etc., although the invention can also be applied to various types of high-pressure pumps and compressors, and for other percussion purposes, such as with rock-drills for example. There are also numerous other conceivable fields of application.

I claim:

1. A high speed punch press apparatus for briefly storing and impulsively delivering mechanical energy, comprising:
   (a) a circular rotatable member (2),
   (b) means (7) for rotatably driving the rotatable member,
   (c) a relatively light weight, linearly reciprocable power delivering device (3),
   (d) an elastically compressible energy absorbing member (4) operatively coupled to the power delivering device for compressively storing energy during movement of the power delivering device in one direction and for expansively releasing such stored energy to rapidly move said device in an opposite direction at a rate of acceleration substantially exceeding that of gravity upon the rotatable member passing a limit position, such that the resulting impulsive energy delivery rate exceeds 750 strokes per minute,
   (e) a first coupling member (2) defined by the rotatable member, and
   (f) a second coupling member (5a) connected to the power delivering device by a crank (5) and operatively disposed for engagement with the first coupling member, wherein:
      (1) the first coupling member comprises a closed curve within the circular rotatable member successively defining, in a direction of rotation thereof, a single, inwardly extending, tooth-like dogging projection (2a), a single adjacent, outwardly extending recess (2b) radially spaced from a center of the rotatable member, and a circular arc (2c) having a constant radius substantially equal to a radius at a greatest depth of the recess, wherein said closed curve thus approximates the shape of a central vertical section through an apple, and
      (2) the second coupling member comprises a follower pin configured to mate with and nestingly engage within the recess and the dogging projection for movement in a constant radius path from a lower released position to an upper, diametrically opposite position whereat the rotatable member is at its limit position such that the follower pin movement repetitively approximates that of a semi-circular path in engagement with the recess closed by a diametrical path free of any engagement with the first coupling member.

2. An apparatus according to claim 1, wherein the rotatable member includes a housing (2d) which is connected to a drive shaft and which accommodates a roller (6) connecting with and surrounding the second coupling member (5a) to form a guide therefor.

3. An apparatus according to claim 2, wherein the housing is provided with a cover (2e) which defines the first coupling member (2a, 2b) and the closed, apple shaped curve (2c).

4. An apparatus according to claims 1 or 3, wherein two rotatable members (2) are symmetrically arranged and adapted to co-act with a respective second coupling member (5a) on a common shaft arranged to co-act with a crank shaft located between the rotatable members (2b), and the rotatable members are arranged to co-act with gears (2'), each of which engages a respective gear (7') on a common drive shaft.

* * * * *